US009171167B2

(12) United States Patent
Ayyagari et al.

(10) Patent No.: US 9,171,167 B2
(45) Date of Patent: Oct. 27, 2015

(54) METHODS AND SYSTEMS FOR USE IN ANALYZING CYBER-SECURITY THREATS IN AN AVIATION PLATFORM

(71) Applicant: The Boeing Company, Chicago, IL (US)

(72) Inventors: Arun Ayyagari, Seattle, WA (US); Winfeng Li, Renton, WA (US); John Eric Bush, Bothell, WA (US); Sudhakar S. Shetty, Mercer Island, WA (US); Brian C. Grubel, Glen Burnie, MD (US); Dion S. Reid, Grasonville, MD (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 13/922,825

(22) Filed: Jun. 20, 2013

(65) Prior Publication Data

US 2014/0380485 A1 Dec. 25, 2014

(51) Int. Cl.
G06F 21/00 (2013.01)
G06F 21/57 (2013.01)
H04L 29/06 (2006.01)

(52) U.S. Cl.
CPC .......... *G06F 21/577* (2013.01); *H04L 63/1433* (2013.01)

(58) Field of Classification Search
USPC ................................................ 713/189–194
See application file for complete search history.

(56) References Cited

U.S. PATENT DOCUMENTS

2009/0133112 A1* 5/2009 Kauffman et al. ............... 726/11
2010/0205014 A1* 8/2010 Sholer et al. ...................... 705/4
2012/0210387 A1* 8/2012 Sampigethaya et al. .......... 726/1

FOREIGN PATENT DOCUMENTS

WO 0070463 11/2000

OTHER PUBLICATIONS

U.S. Appl. No. 13/540,955, filed Jul. 3, 2012.
U.S. Appl. No. 13/690,517, filed Nov. 30, 2012.
Salter, C. et al.; Toward a Secure System Engineering Methodology; New Security Paradigms Workshop, Sep. 1998, pp. 2-10.
Extended European Search Report of Application No. 14172373.4; Dec. 9, 2014; 7 pages.
Hahn, A. et al.; Smart Grid Cybersecurity Exposure Analysis and Evaluation Framework; 2010 IEEE Power and Energy Society General Meeting; Jul. 25-29, 2010; Minneapolis, MN; 6 pages.

* cited by examiner

Primary Examiner — Ghazal Shehni
(74) Attorney, Agent, or Firm — Armstrong Teasdale, LLP

(57) ABSTRACT

Methods and systems for use in in analyzing cyber-security threats for an aircraft are described herein. One example method includes generating an interconnection graph for a plurality of interconnected aircraft systems. The interconnection graph includes a plurality of nodes and a plurality of links. The method also includes defining a cost function for a cyber-security threat to traverse each link and defining a requirements function for a cyber-security threat to exploit each node. The method further includes generating a set of threat traversal graphs for each cyber-security threat of a plurality of cyber-security threats.

20 Claims, 6 Drawing Sheets

METHODS AND SYSTEMS FOR USE IN ANALYZING CYBER-SECURITY THREATS IN AN AVIATION PLATFORM

BACKGROUND

The field of the disclosure relates generally to cyber-security, and, more specifically, to methods and systems for use in analyzing cyber-security threats in aviation platforms.

At least some known aviation platforms and infrastructures have adopted e-Enabled architectures and technologies to take advantage of operational and performance efficiencies that result from being networked. Aviation platforms and infrastructures are generally complex systems that involve hierarchically-networked embedded systems and controllers having varying operational criticality, reliability, and availability requirements as aviation platforms and infrastructures, both onboard and off-board aircrafts, have become e-Enabled, and as such, may be the targets of cyber-security threats.

Generally, within at least some known platforms, the embedded systems and controllers are hosted on general purpose computing devices, commercial software operating systems, and/or specific custom applications performing intended system functions. Onboard embedded systems and controllers are networked via standards-based protocols to enable seamless integration of the e-Enabled architecture and have increased feature capabilities and functionalities of aviation platforms. However, such integration may also increase the risk of cyber security attacks that leverage existing vulnerabilities of the deployed software and hardware implementations. Some threat vectors exist that only affect system level components, while other threat vectors result in exploits when sub-system implementations are integrated.

Some known general purpose applications provide individual analysis frameworks such as security analysis for networked data flows and formulation of attack/threat trees. Such applications do not provide a unified architectural framework for end-to-end cyber security analysis of complex, highly-networked systems that enable analysts to formulate the system starting at the feature level, and then decompose the data into detailed level implementations to enable a programmatic analysis to determine the likelihood and consequence of current and emerging cyber security threats. Lack of such an application for end-to-end cyber security analysis for aerospace processes/systems may limit the ability to rapidly assess the robustness/availability of aerospace processes/systems to current and emerging cyber security threats in a cost effective manner. In addition, the lack of such an application may also limit the ability of regulatory and/or certification processes to be executed in a timely and cost-effective manner.

BRIEF DESCRIPTION

In one aspect, a method for use in analyzing cyber-security threats for an aircraft is provided. The method includes generating an interconnection graph for a plurality of interconnected aircraft systems. The interconnection graph includes a plurality of nodes and a plurality of links. The method also includes defining a cost function for a cyber-security threat to traverse each link and defining a requirements function for a cyber-security threat to exploit each node. The method further includes generating a set of threat traversal graphs for each cyber-security threat of a plurality of cyber-security threats.

In another aspect, system for use in analyzing cyber-security threats for an aircraft is provided. The system includes a processor unit coupled to a memory device. The processor unit is programmed to generate an interconnection graph for a plurality of interconnected aircraft systems. The interconnection graph includes a plurality of nodes and a plurality of links. The processor unit is also programmed to define a cost function for a cyber-security threat to traverse each link and define a requirements function for a cyber-security threat to exploit each node. The processor unit is further programmed to generate a set of threat traversal graphs for each cyber-security threat of a plurality of cyber-security threats.

In yet another aspect, a computer-readable storage device is provided having encoded thereon computer readable instructions that are executable by a processor to perform functions including generating an interconnection graph for a plurality of interconnected aircraft systems. The interconnection graph includes a plurality of nodes and a plurality of links. The processor also performs functions including defining a cost function for a cyber-security threat to traverse each link and defining a requirements function for a cyber-security threat to exploit each node. The processor further performs functions including generating a set of threat traversal graphs for each cyber-security threat of a plurality of cyber-security threats.

DETAILED DESCRIPTION

The implementations described herein are directed to methods and systems for use in analyzing cyber-security threats in aviation platforms. As used herein, the term "aviation platform" refers to a hardware architecture (hardware components) and a software framework (software components), including application frameworks, that enable software, particularly application software, to operate an aircraft. As used herein, the term "cyber-security threat" refers to any circumstance or event having the potential to adversely impact an asset (e.g., an aircraft, an aircraft component) through unauthorized access, destruction, disclosure, modification of data, and/or denial of service. Implementations are described herein with reference to computing devices. As used herein, a computing device may include an end-user device and/or an embedded device that is configured to identify cyber-security threats in an aviation platform.

Figure 1:
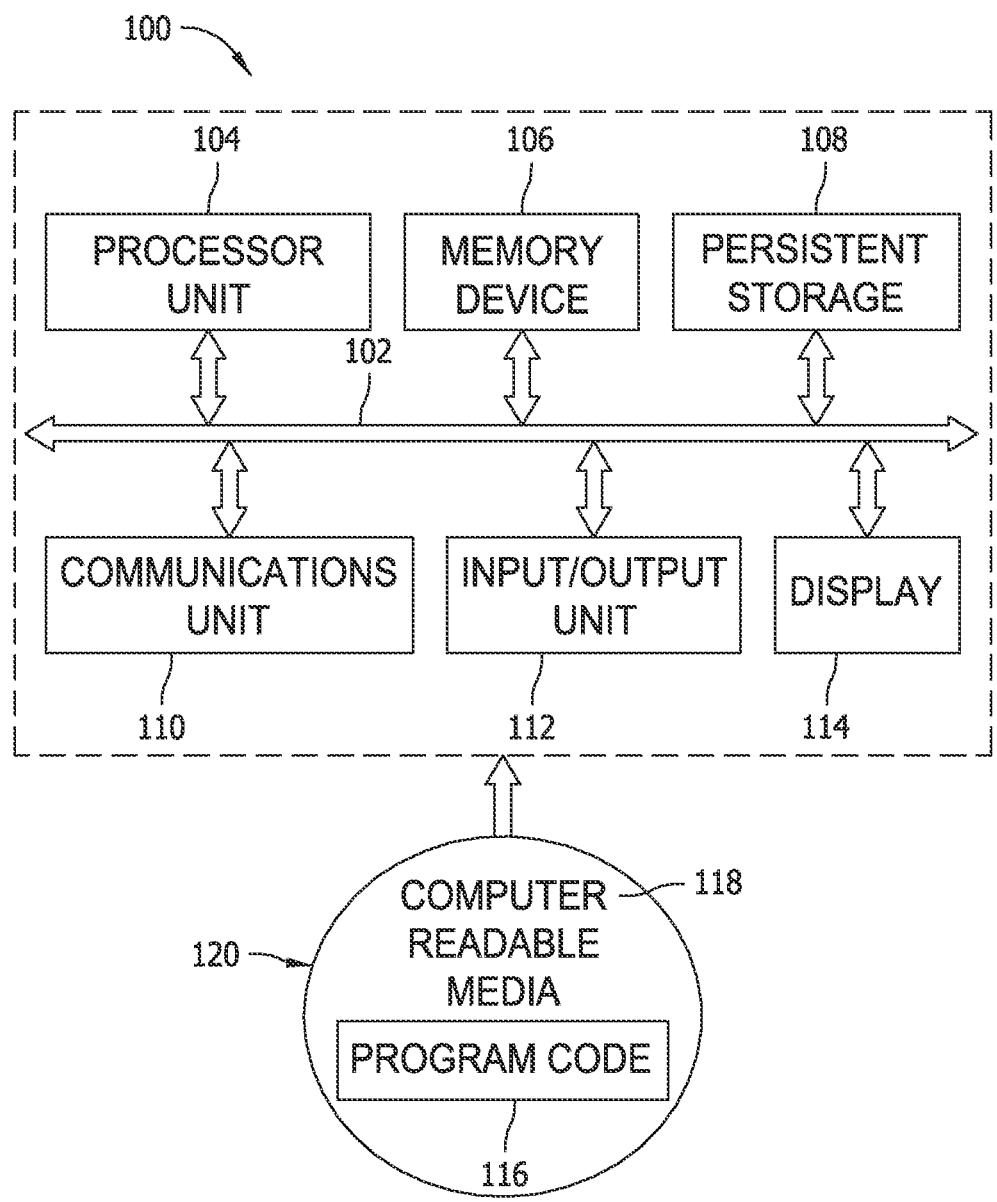
FIG. 1 is a block diagram of an exemplary computing device.

FIG. 1 is a block diagram of an exemplary computing device 100 that may be used to identify cyber-security threats. In the exemplary implementation, computing device 100 includes a communications fabric 102 that enables communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another implementation, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., communications components, threat determination components, threat relevancy components, threat prioritization components, and threat evaluation components), data received from data sources, aircraft information, hardware and/or software component information, business descriptions associated with hardware and/or software components, safety information hardware and/or software components, threat tree models, and/or any other information suitable for use with the methods described herein.

Communications unit 110, in these examples, enables communications with other computing devices or systems. In the exemplary implementation, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different implementations may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104.

The program code in the different implementations may be embodied on different physical or tangible computer readable media, such as memory 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative implementations, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include an event processor component, a complex event processing component, a machine learning component, a decision support component, and/or any component suitable for the methods described herein. Each component may include computer-executable instructions that, when executed by processor unit 104, cause processor unit 104 to perform one or more of the operations described herein.

The different components illustrated herein for computing device 100 are not architectural limitations to the manner in which different implementations may be implemented. Rather, the different illustrative implementations may be implemented in a computer system including components in addition to or in place of those illustrated for computing device 100. For example, other components shown in FIG. 1 can be varied from the illustrative examples shown.

In one example, a storage device in computing device 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
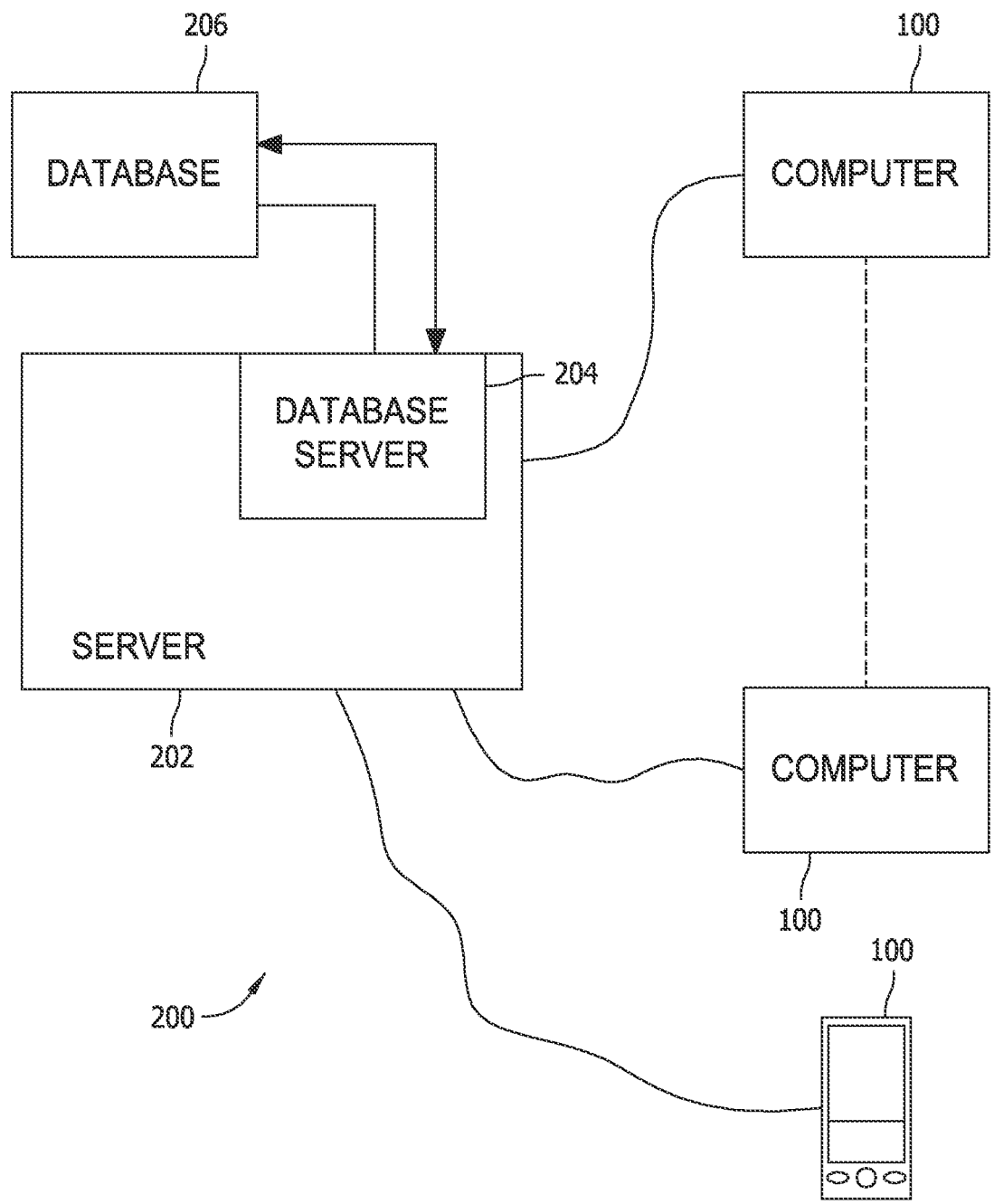
FIG. 2 is a block diagram of an exemplary network including the computing device shown in FIG. 1

Some exemplary implementations are implemented using a network of computing devices. FIG. 2 is a simplified block diagram of an exemplary network 200 of computing devices 100.

More specifically, in the example implementation, system 200 includes a server system 202, which is a type of computer system, and a plurality of computing devices 100 connected to server system 202. In one implementation, server system 202 is accessible to computing devices 100 using the Internet. In other implementations, server system 202 may be accessible using any other suitable communication network, including, for example, a wide area network (WAN), a local area network (LAN), etc. Computing devices 100 may be interconnected to the Internet through many interfaces including a network, such as a local area network (LAN) or a wide area network (WAN), dial-in-connections, cable modems, and special high-speed ISDN lines. Computing devices 100 may be any device capable of interconnecting to the Internet including a web-based phone, personal digital assistant (PDA), or other web-based connectable equipment.

A database server 204 is connected to database 206, which contains information on a variety of matters, as described below in greater detail. In one implementation, centralized database 206 is stored on server system 202 and can be accessed by logging onto server system 202 through one of computing devices 100. In an alternative implementation, database 206 is stored remotely from server system 202 and may be non-centralized. Moreover, in some embodiments, database 206 and database server 204 utilize role-based authentication.

Figure 3:
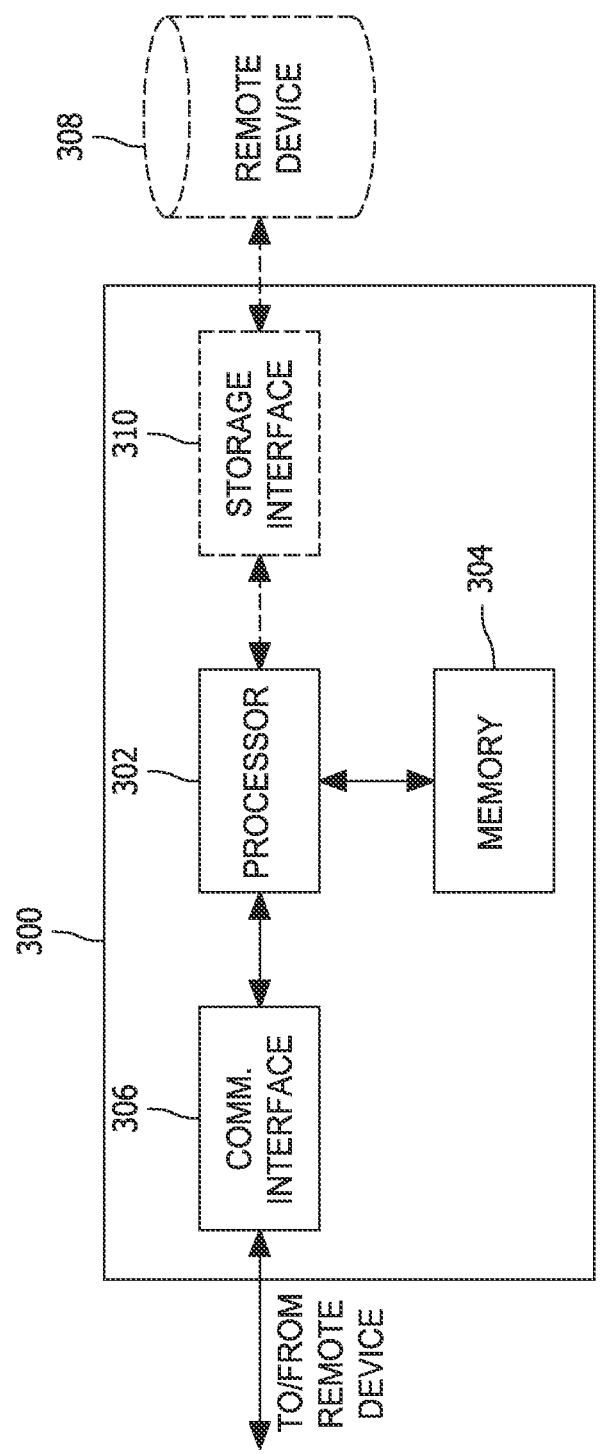
FIG. 3 is an exemplary configuration of a server computer device.

FIG. 3 illustrates an exemplary configuration of a server computer device 300 such as server system 202 (shown in FIG. 2). Server computer device 300 may include, but is not limited to, database server 204. Server computer device 300 includes a processor 302 for executing instructions. Instructions may be stored in a memory area 304, for example. Processor 302 may include one or more processing units (e.g., in a multi-core configuration). Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Processor 302 is operatively coupled to a communication interface 306 such that server computer device 300 is capable of communicating with a remote device such as computing device 100 or another server computer device 300. For example, communication interface 306 may receive requests from computing devices 100 via the Internet.

Processor 302 may also be operatively coupled to a storage device 308. Storage device 308 is any computer-operated hardware suitable for storing and/or retrieving data. In some implementations, storage device 308 is integrated in server computer device 300. For example, server computer device 300 may include one or more hard disk drives as storage device 308. In other implementations, storage device 308 is external to server computer device 300 and may be accessed by a plurality of server computer devices 300. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some implementations, processor 300 is operatively coupled to storage device 308 via a storage interface 310. Storage interface 310 is any component capable of providing processor 300 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 300 with access to storage device 308.

An example system for use in network architecture threat modeling may be implemented using computing device 100 in network 200. The system includes display device 114, a memory device for storing a plurality of attributes for each of a plurality of network objects, and processor 104 communicatively coupled to the memory device. In some implementations, the memory device is persistent storage 108. In other implementations, the memory device is memory device 304 or 308. Database 206 stores the plurality of attributes of each of the plurality of network aviation systems.

Figure 4:
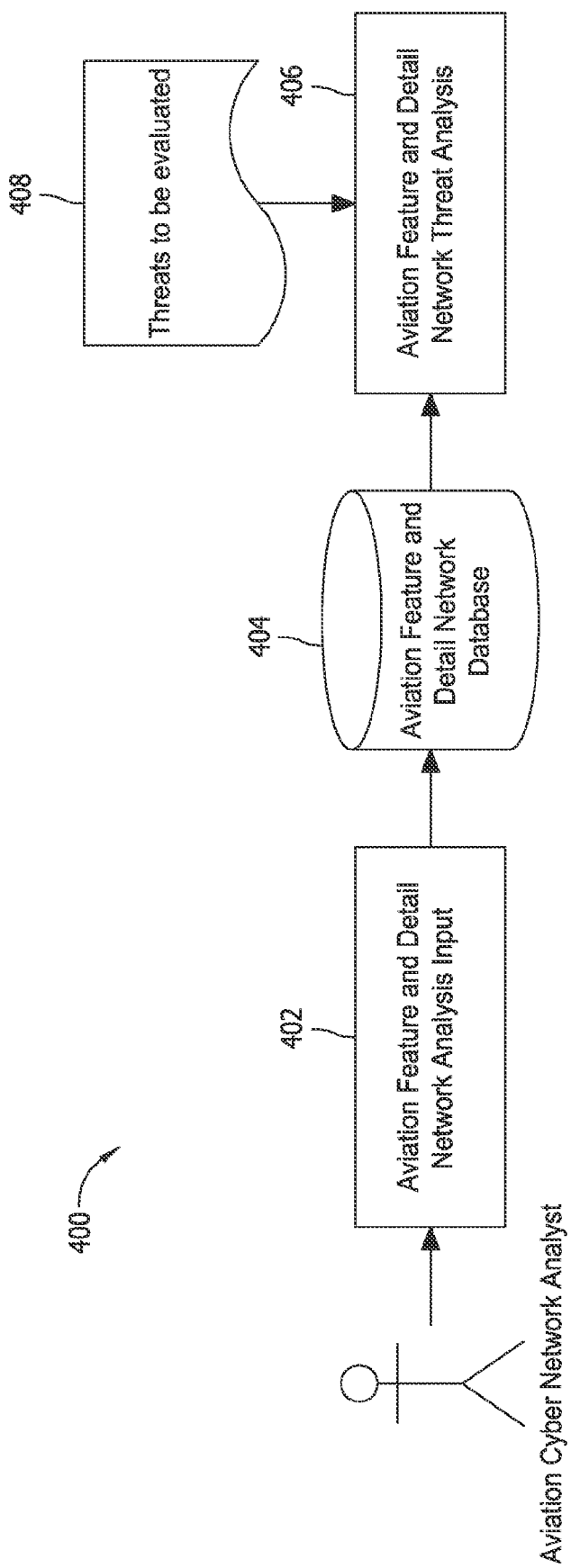
FIG. 4 is a block diagram of a feature connectivity network and detailed network analysis system.

FIG. 4 is a block diagram of a feature connectivity network and detailed network analysis system 400. Processor 104 is configured, such as by executable code stored in persistent storage 108, to receive input from a feature and detail network analysis input component 402 of at least a first network aviation system and a second network aviation system from the plurality of network aviation systems. The user inputs feature and detail network analysis input 402 using input/output unit 112. The network aviation systems available to the user are displayed to the user on display device 114, such as via a graphical user interface (GUI). Processor 104 creates a network architecture including at least the first network aviation system and the second network aviation system. In some implementations, the user selects individual aviation systems and uses the selected aviation system to create the network architecture. In other implementations, the user selects a template of a network architecture stored in the memory device. The template includes at least two network aviation systems. The user may expand a network architecture from a template by selecting additional aviation systems or templates to add to the network architecture. Moreover, the user may store a created network as a custom template. In some embodiments, templates, including custom templates, may be shared among users.

In this implementation, processor 104 is configured to associate the stored plurality of attributes of the aviation systems with the selected network aviation systems in the network architecture. Thus, the created network architecture includes the attributes retrieved from the database 206 for each network aviation system. Attributes for the network aviation systems can include any data related to the aviation systems, how they function, known weaknesses of the aviation systems, etc. In various implementations, for example, attribute data includes the name of the aviation system, an icon or other graphical representation of the aviation system, a part number, an indicator of whether the aviation system is hardware, software, or logical, networks or systems in which the aviation system is or may be used, templates and network architectures that include the aviation system, known threats/weaknesses of the aviation system, protocols used by the aviation system, the aviation system's physical connections (inputs, outputs, etc.), the aviation system's dataflow connections, manufacturer of the aviation system, etc.

Figure 5:
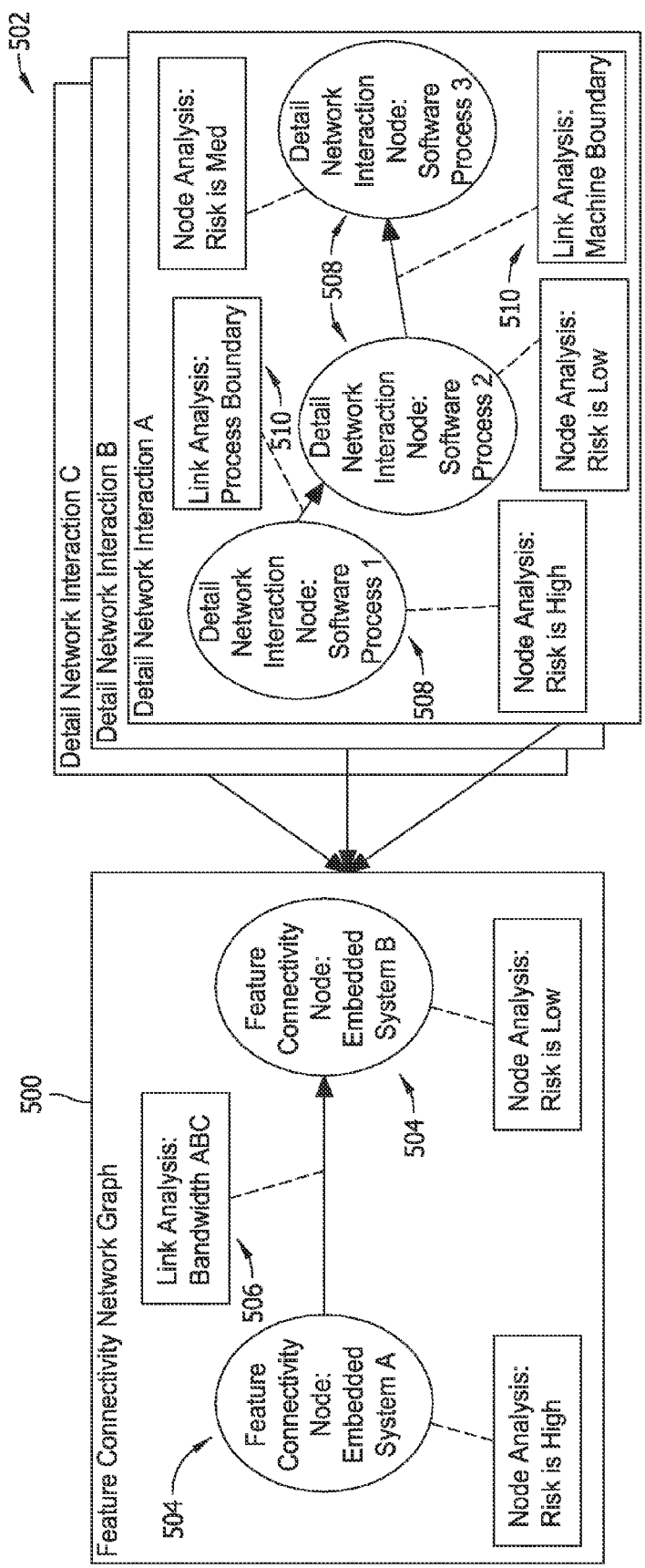
FIG. 5 is a feature connectivity graph associated with a plurality of detailed network interaction graphs generated by the feature connectivity network and detailed network analysis system shown in FIG. 4.

FIG. 5 is a feature connectivity graph 500 associated with a plurality of detailed network interaction graphs 502 generated by feature connectivity network and detailed network analysis system 400 (shown in FIG. 4). In the exemplary implementation, the GUI displays a map between high-level features networks 500 to detailed network interactions 502. High-level features connectivity networks 500 are represented as a graph structure including nodes 504 and links 506. Nodes 504 represent aviation systems and links represent the network connections between the aviation systems. Detailed network interactions 502 are also represented as a graph-structure where nodes 508 represent the software processes, data-stores or input vectors. The user may use the GUI to input specific analysis. For example, the user may associate a node 508 with a particular piece of software or identify ports being used. Links 510 represent the interaction between the software processes, data-stores or input vectors. The user may further use the GUI to annotate a link to specify that a link is of a certain protocol including IP, TCP, UDP, ARINC, or Ethernet. Each node 504 or 508 and each link 506 or 510 includes a globally unique identifier (GUID). In the implementation shown in FIG. 5, embedded System A hosts Software Processes 1 and 2. Embedded System B hosts Software Process 3.

The graphical user interface enables analysis of each node and link for specific details and capabilities. The analysis of feature connectivity nodes 504 includes information of the aviation systems such as hardware and software used. The analysis of feature connectivity links 506 includes physical mediums used such as wired or wireless mediums, network transport protocols and ports, bandwidth limitations, etc. The analysis of detailed network interaction nodes 508 includes details such as risk analysis, ease of exploitation, business and certification consequences, risk susceptibility and any proposed design mitigation methods. The analysis of detailed network interaction links 510 includes application protocols used and boundary types such as process boundaries, machine boundaries, trust boundaries, and/or other boundaries.

Referring to FIG. 4, feature connectivity network and detailed network analysis system 400 also includes a feature connectivity network and detailed network interaction database 404 that stores graph data structures generated by aviation feature level and detailed level network analysis input component 402. Database 404 stores feature level networks 500, their associated detailed level network interactions 502 as nodes 508 and links 510, and the analysis associated with each node 508 and each link 510. In an alternative implementation, a current network scan may be performed to facilitate generating a starting architecture. An analyst may then supply metadata to the scan facilitate supplementing the generated starting architecture.

Feature connectivity network and detailed network analysis system 400 also includes an aviation cyber-security threat analysis component 406. Analysis component 406 accesses feature connectivity network and detailed network interaction database 404 to programmatically evaluate the likelihood and consequences of cyber-security threats 408.

In the exemplary implementation, cyber-security threats 408 can include hardware and software threats and/or vulnerabilities. Cyber-security threats 408 can be received from any source retaining relevant threat data including, but not limited to The Common Vulnerabilities and Exposures List (CVE), The National Institute of Standards and Technology (NIST), The European Network and Information Security Agency (ENISA), and MITRE. Cyber-security threats 408 can be known security threats and/or threats that are received from manual input. In one implementation, cyber-security threats 408 include information about the hardware/software versions and/or configurations affected.

By treating feature connectivity network 500 and the detailed network interaction 502 as graph data structures, graph traversal methods may be used to evaluate the impact of each threat by evaluation of the number of nodes and links a threat is able to traverse. Furthermore, if the analysis on each node and link is used as requirements and costs functions of the graph, the notion of a threat traversing each node and link consumes and creates resources for other threats to be able to compromise the same nodes and links. An example of a requirements function is open ports or authentication requirements. An example of a cost function is the bandwidth supported by the link. As threats exploit each node and/or link, the requirement function increases by the exploit opening new ports or gaining new privileges on the compromised node. Moreover, the cost function of each link limits the traversal of threats. For example, a threat that requires a higher bandwidth than the link's cost function supports may result in a denial of service condition on current services and/or may facilitate restricting the threat from traversing the link. Each threat affects the feature and detail network graphs differently, and by permutation, each combination of threats can describe the effects of joint exploits. For example, if threat A was able to open a port for threat B to propagate.

Attack/threat trees provide a formal, methodical way of describing the security of systems, based on varying attacks. Specifically, attacks against a system are represented in a tree structure, with the goal as the root node and different ways of achieving that goal as leaf nodes. The feature and detailed network connectivity graphs and the cyber security analysis are used to compile and analyze threat trees. The cyber security analysis includes detailed network interaction, risk analysis, ease of exploitation, business and certification consequences, risk susceptibility, and/or any proposed design mitigation methods. The feature connectivity network and detailed network interaction database includes all the required information to construct and analyze the attack/threat tree as the information pertaining to the various cyber security threats are complied along with their likelihood and consequence for both technical and business risk perspective. Moreover, the defined and developed graph traversal methods that evaluate the impact of each threat by determining the number of nodes and links the threat is able to traverse may be used to programmatically derive and analyze the attack/threat tree to determine system robustness and vulnerabilities.

Figure 6:
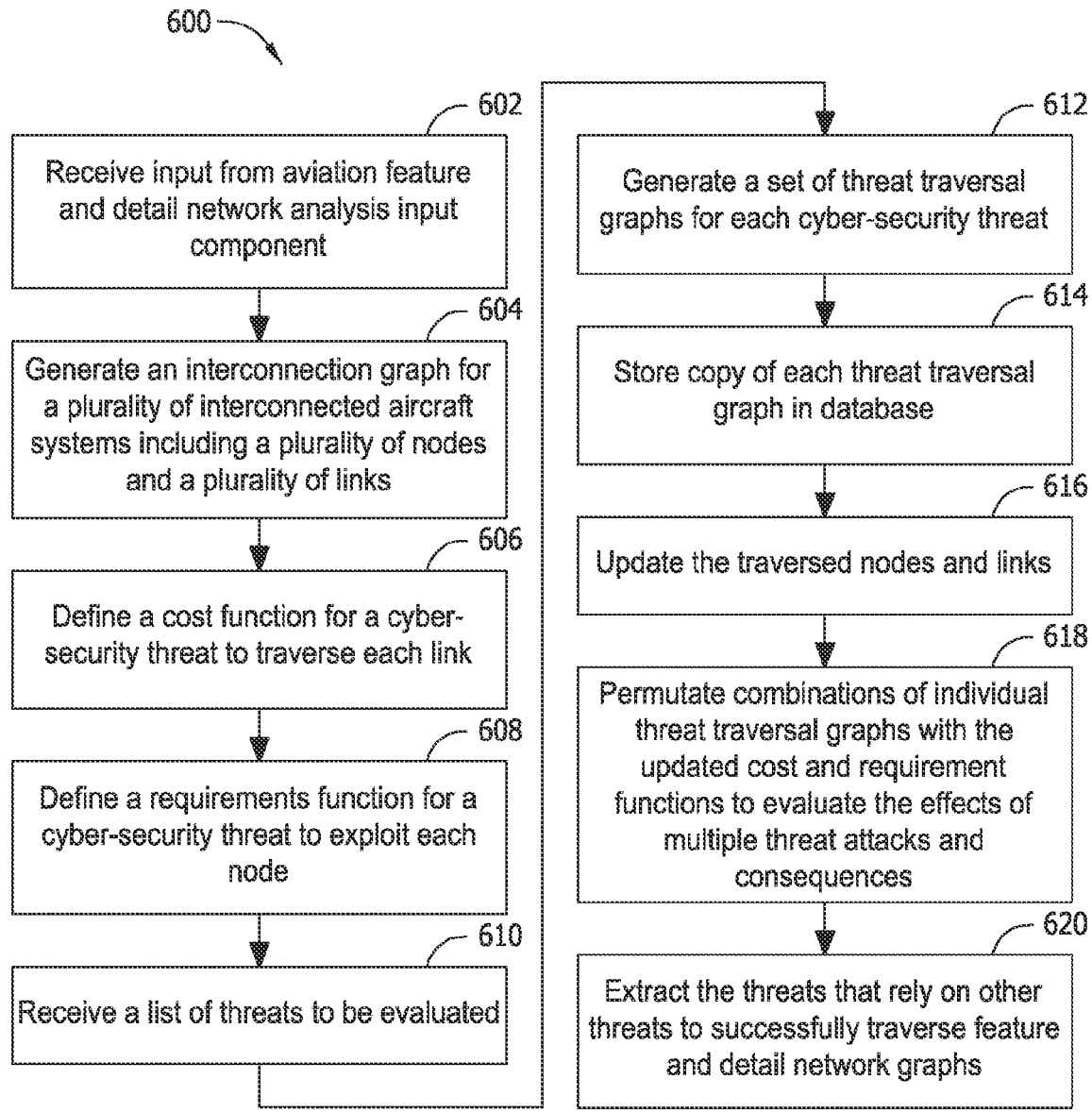
FIG. 6 is a flow chart of an exemplary method of analyzing a threat by the feature connectivity network and detailed network analysis system shown in FIG. 4.

FIG. 6 is a flow chart 600 of an exemplary method of analyzing a threat by feature connectivity network and detailed network analysis system 400 (shown in FIG. 4). System 400 receives 602 input from aviation feature and detail network analysis input component 402. Based on the input, system 400 generates 604 an interconnection graph for a plurality of interconnected aircraft systems including a plurality of nodes and a plurality of links Generating the interconnection graph may include generating at least one feature connectivity graph and at least one network interaction graph. To derive and/or analyze attack/threat trees, system 400 loads each feature connectivity network and all associated detail network interaction diagrams as a graph data structure. The diagrams are retrieved from feature connectivity network and detailed network interaction database 404.

System 400 defines 606 a cost function for a cyber-security threat to traverse each link. The link analysis is used as cost functions in traversing the links. Defining 606 a cost function may further include performing link analysis including at least one of application protocols, bandwidth, and boundary types. System 400 also defines 608 a requirements function for a cyber-security threat to exploit each node. The node analysis is used as requirements functions in the graph. Defining 608 a requirements function comprises performing node analysis including at least one of port access and authentication requirements.

System 400 receives 610 a list of threats to be evaluated. The threats include published and emerging threats and are received from external and/or internal sources. Analysis component 406 evaluates each threat by traversing each feature connectivity graph using traditional graph traversal methods. More specifically, system 400 generates 612 a set of threat traversal graphs for each cyber-security threat of a plurality of cyber-security threats. In doing so, analysis component 406 considers the cost and requirements functions attributed by the feature node and link analysis. Generating 612 a set of threat traversal graphs may also include traversing the interconnection graph for each cyber-security threat and applying the cost and requirement functions to the interconnection graph for each cyber-security threat. System 400 also evaluates each threat by traversing each detailed network interaction graph using traditional graph traversal methods. In doing so, analysis component 406 considers the cost and requirement functions attributed by the detail node and link analysis.

A copy of each threat traversal graph is stored 614 in database 206. System 400 updates 616 the traversed nodes and links if the threat's exploit modifies the cost or requirement functions. For example, at least one of the cost function and the requirements function may be updated based on analyzing a cyber-security threat traversing the interconnection graph.

System 400 permutates 618 all combinations of individual threat traversal graphs with the updated cost and requirement functions to evaluate the effects of multiple threat attacks and consequences. Each threat is re-evaluated by re-traversing each graph with the effects of successful threat exploits (i.e., the updated cost and requirement functions). System 400 stores the feature connectivity graphs and the detailed network interaction graphs that have been compromised by either a single threat and/or multiple threats in database 206. From the compromised feature and detail network graphs with associated threats, system 400 can then extract 620 the threats that rely on other threats to successfully traverse feature and detail network graphs.

As the exemplary system is used and attributes are updated with new findings, the system becomes more robust. For example, the new findings may track metadata such as, but not limited to, the findings' date of creation and/or update, an identity of a user that created the findings, and the history of revisions to the findings. Further, the system may be updated to a previous revision such that multiple users can collaborate on the same finding and/or such that multiple findings may be applied to a selected node. When a second user creates a network architecture, the findings identified by the previous user(s) are automatically applied to the appropriate node(s) and/or link(s) using the GUID of each node or link. Thus, the second user does not necessarily need to repeat the threat analysis performed by the first user(s) and/or may perform a different threat analysis. Moreover, in various implementations, the system is continuously updated. When, for example a second user stores new findings associated with one or more nodes and/or links, the updated attributes are applied to existing network architectures, such as those created by the first user. Additionally, by using GUIDs, different users can analyze different areas of a platform and the system can superimpose the performed analysis referenced by the GUIDs for a more complete result of aggregated threat compilations.

Implementations described herein provide methods and systems for use in identifying cyber-security threats in aviation platforms. The methods and systems facilitate protecting overall system design and implementation, for e-Enabled aviation platforms and infrastructure, against existing and emerging cyber-security threats in both proactive and reactive manner. Moreover, the methods and systems described herein provide a comprehensive application service to map high level feature connectivity networks to each detailed network interactions within the feature connectivity network to effectively analyze the likelihood and consequence of cyber security threats at the feature level and the detailed level implementations. The application includes graph traversal methods that enable one to programmatically traverse the feature level and detailed level network interactions and associated systems/sub-systems to evaluate the impact of each threat and enable programmatic derivation and analysis of attack/threat trees to determine system robustness and vulnerabilities. Furthermore, the systems described herein enable additional strengthening of system design and implementation leading to secured designs and infrastructures which lead to lower certification, regulatory, and operational costs.

A technical effect of the system and method described herein includes at least one of: (a) generating an interconnection graph for a plurality of interconnected aircraft systems, wherein the interconnection graph includes a plurality of nodes and a plurality of links; (b) defining a cost function for a cyber-security threat to traverse each link; (c) defining a requirements function for a cyber-security threat to exploit each node; and (d) generating a set of threat traversal graphs for each cyber-security threat of a plurality of cyber-security threats.

Although the foregoing description contains many specifics, these should not be construed as limiting the scope of the present disclosure, but merely as providing illustrations of some of the presently preferred implementations. Similarly, other implementations of the invention may be devised which do not depart from the spirit or scope of the present invention. Features from different implementations may be employed in combination. The scope of the invention is, therefore, indicated and limited only by the appended claims and their legal equivalents, rather than by the foregoing description. All additions, deletions, and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one implementation" of the present invention are not intended to be interpreted as excluding the existence of additional implementations that also incorporate the recited features.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in analyzing cyber-security threats for aircraft systems, said method comprising:
   generating an interconnection graph for a plurality of interconnected aircraft systems, wherein the interconnection graph includes a plurality of nodes representing at least one of an aircraft system of the plurality of interconnected aircraft systems, a software process, a data-store, and an input vector, and a plurality of links representing interaction between the plurality of nodes;
   defining a cost function for a cyber-security threat to traverse each link;
   defining a requirements function for a cyber-security threat to exploit each node; and
   generating a set of threat traversal graphs indicating an impact of each cyber-security threat of a plurality of cyber-security threats on the plurality of interconnected aircraft systems, the set of threat traversal graphs based on an evaluation of a number of nodes and links capable of being traversed by each cyber-security threat of the plurality of cyber-security threats to determine vulnerabilities in the plurality of interconnected aircraft systems.

2. The method in accordance with claim 1, wherein generating the set of threat traversal graphs for each cyber-security threat of the plurality of cyber-security threats further comprises: traversing the interconnection graph for each cyber-security threat of the plurality of cyber-security threats; and applying the cost and requirement functions to the interconnection graph for each cyber-security threat of the plurality of cyber-security threats.

3. The method in accordance with claim 1, further comprising updating at least one of the cost function and the requirements function based on analyzing each cyber-security threat of the plurality of cyber-security threats traversing the interconnection graph.

4. The method in accordance with claim 3, further comprising performing permutations of a combination of the threat traversal graphs with at least one of the updated cost function and requirements function to evaluate at least one effect of multiple cyber-security threats.

5. The method in accordance with claim 1, wherein generating the interconnection graph further comprises generating at least one feature connectivity graph and at least one network interaction graph.

6. The method in accordance with claim 1, further comprising performing attack tree analysis on the interconnection graph.

7. The method in accordance with claim 1, wherein defining the cost function comprises performing link analysis including at least one of application protocols, bandwidth, and boundary types.

8. The method in accordance with claim 1, wherein defining the requirements function comprises performing node analysis including at least one of port access and authentication requirements.

9. The method in accordance with claim 1, further comprising displaying the set of threat traversal graphs on a graphical user interface.

10. The method in accordance with claim 1, further comprising receiving the cyber-security threat from at least one of Common Vulnerabilities and Exposures List (CVE), National Institute of Standards and Technology (NIST), European Network and Information Security Agency (ENISA), and MITRE.

11. A system for use in analyzing cyber-security threats for aircraft systems, said system comprising:
   a memory device; and
   a processor unit coupled to said memory device, wherein said processor unit is programmed to:
   generate an interconnection graph for a plurality of interconnected aircraft systems, wherein the interconnection graph includes a plurality of nodes representing at least one of an aircraft system of the plurality of interconnected aircraft systems, a software process, a data-store, and an input vector, and a plurality of links representing interaction between the plurality of nodes;
   define a cost function for a cyber-security threat to traverse each link;
   define a requirements function for a cyber-security threat to exploit each node; and
   generate a set of threat traversal graphs indicating an impact of each cyber-security threat of a plurality of cyber-security threats on the plurality of interconnected aircraft systems, the set of threat traversal graphs based on an evaluation of a number of nodes and links capable of being traversed by each cyber-security threat of the plurality of cyber-security threats to determine vulnerabilities in the plurality of interconnected aircraft systems.

12. The system in accordance with claim 11, wherein said processor unit is further programmed to: traverse the interconnection graph for each cyber-security threat of the plurality of cyber-security threats; and apply the cost and requirement functions to the interconnection graph for each cyber-security threat of the plurality of cyber-security threats.

13. The system in accordance with claim 11, wherein said processor unit is further programmed to update at least one of the cost function and the requirements function based on analyzing the cyber-security threat traversing the interconnection graph.

14. The system in accordance with claim 11, wherein said processor unit is further programmed to perform permutations of a combination of the threat traversal graphs with at least one of the updated cost function and requirements function to evaluate effects of multiple cyber-security threats.

15. The system in accordance with claim 11, wherein to generate the interconnection graph, said processor unit is further programmed to generate at least one feature connectivity graph and at least one network interaction graph.

16. The system in accordance with claim 11, further comprising a display unit configured to display the set of threat traversal graphs generated by said processor unit.

17. A computer-readable storage device having encoded thereon computer readable instructions that are executable by a processor to perform functions comprising:
   generating an interconnection graph for a plurality of interconnected aircraft systems, wherein the interconnection graph includes a plurality of nodes representing at least one of an aircraft system of the plurality of interconnected aircraft systems, a software process, a data-store, and an input vector, and a plurality of links representing interaction between the plurality of nodes;
   defining a cost function for a cyber-security threat to traverse each link;
   defining a requirements function for a cyber-security threat to exploit each node; and
   generating a set of threat traversal graphs indicating an impact of each cyber-security threat of a plurality of cyber-security threats on the plurality of interconnected aircraft systems, the set of threat traversal graphs based on an evaluation of a number of nodes and links capable of being traversed by each cyber-security threat of the plurality of cyber-security threats to determine vulnerabilities in the plurality of interconnected aircraft systems.

18. The computer-readable storage device in accordance with claim 17, wherein the instructions are executable by the processor to perform functions comprising generating at least one feature connectivity graph and at least one network interaction graph.

19. The computer-readable storage device in accordance with claim 17, wherein the instructions are executable by the processor to perform functions comprising performing link analysis including at least one of application protocols, bandwidth, and boundary types.

20. The computer-readable storage device in accordance with claim 17, wherein the instructions are executable by the processor to perform functions comprising performing node analysis including at least one of port access and authentication requirements.

* * * * *